Figure 1:
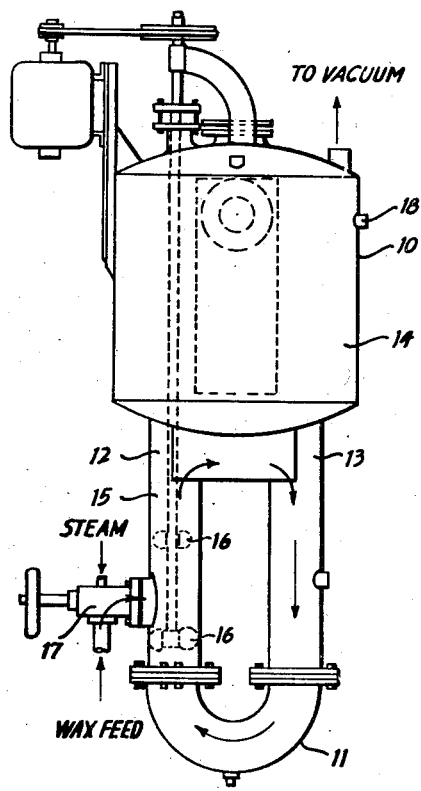

Dec. 21, 1948.　　O. J. SWENSON　　2,456,656
WAX PRODUCTION
Filed July 12, 1946

INVENTOR
Oscar J. Swenson
BY Robert J. Leahy
ATTORNEY

Patented Dec. 21, 1948

2,456,656

UNITED STATES PATENT OFFICE 2,456,656

WAX PRODUCTION

Oscar J. Swenson, Ithaca, N. Y., assignor to Colonial Sugars Company, New York, N. Y., a corporation of New Jersey, and S. C. Johnson & Son, Inc., Racine, Wis., a corporation of Wisconsin Application July 12, 1946, Serial No. 683,137

12 Claims. (Cl. 260—428.5)

This invention relates to the production of wax, and more particularly relates to an improved method of extracting a hard wax from crude sugar cane wax.

Various methods are known for separating crude sugar cane wax from clarification muds, or other sugar cane factory waste products by the use of organic solvents, such as toluene. Several investigators have separated crude sugar cane wax into a soluble fraction and a hard wax fraction; one recent method is described in U. S. Patent No. 2,381,420 to Balch. By this method chipped or broken crude wax pieces are placed in a container and covered with a fat solvent, such as acetone, and the fatty portions are separated from the crude wax by a process of diffusing into the solvent. The disadvantages of this process, however, are that the diffusion takes a day, and is preferably repeated from three to seven times. From a commercial standpoint the process is therefore inefficient and would be costly because of the length of time needed to carry out the process. In addition, the separation of the acetone solution from the insoluble solids is difficult.

Now, in accordance with my invention, I have developed a practical process for extracting a hard wax from crude sugar cane wax.

My method comprises contacting molten crude sugar cane wax with a fat solvent in liquid phase to form a hot wax solution, precipitating a hard wax fraction from said hot wax solution by contacting the hot wax solution with a fat solvent-wax slurry and recovering the hard wax fraction.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

One hundred pounds of crude sugar cane wax was melted, filtered to remove any solid foreign matter, and mixed with 71 pounds of liquid acetone which had been heated under pressure to a temperature of 98° to 100° C. The solution of acetone and crude wax at about 100° C. was injected into an agitated vessel containing a slurry which consisted of a suspension of solid hard wax fraction in a solution of the soft fraction in acetone. The temperature of the slurry was about 25° to 30, C. This temperature was maintained by connecting the vessel to a reflux condenser which in turn is connected to a vacuum line. The vacuum was held at 240 mm. Hg absolute which caused the acetone to boil at 25° to 30° C. The heat introduced into the vessel was thus removed by the vaporizing acetone which then passed to the reflux condenser and was returned to the vessel as condensate. As the hot acetone-crude wax solution was injected into the slurry, the acetone flashes, thus cooling and solidifying the crude wax to form more slurry. Further cooling was effected by contact of the hot entering stream with the relatively cold slurry.

Four hundred two pounds of additional acetone was introduced into the vessel at a rate sufficient to give the desired concentration of slurry. The hot acetone-crude wax solution and the additional acetone was fed continuously into the vessel. The slurry produced in this manner was easily filterable and was filtered in conventional filtration equipment. The filter cake was washed with an additional 400 pounds of acetone. The filtrate containing the soft fraction weighed 705 pounds and was evaporated in conventional evaporating equipment. Thirty-three pounds of soft fraction was recovered. This soft fraction was a dark green oil at room temperature.

A hard wax fraction was recovered from the filter cake by evaporating the solvent.

Example 2

Example 1 was repeated except that methylethylketone was substituted for the acetone as the fat solvent. It was the equivalent of acetone as a fat solvent for use in this process.

Example 3

Example 1 was repeated except that hexane was substituted for the acetone as the fat solvent. It was the equivalent of acetone as a fat solvent for use in this process.

From the foregoing examples a method has been illustrated by which hard wax may be separated from crude sugar cane wax.

While acetone, methylethylketone and hexane have been shown as the fat solvents, the invention is not so limited. Although these solvents are preferred, other known fat solvents such as ethyl ether, heptane, pentane, and the like may be used.

It is essential that the crude sugar cane wax be heated until it is molten. It is also essential that the fat solvent be in liquid phase, and as the boiling point of some of the fat solvents, such as acetone is below the melting point of the wax, i. e. about 75° C., the procedure must be carried out under pressure sufficient to keep the fat solvent from boiling. While the minimum temperature at which the crude sugar cane wax becomes molten and can be placed in solution in the fat solvent is about 75° C., the upper temperature limit will depend upon the ability of the crude wax to withstand the temperature. Operation at a higher temperature than necessary to insure that the crude wax is molten has the disadvantage of increasing the amount of heat required to be added and subsequently removed, as well as increasing the pressure necessary to maintain the fat solvent in liquid phase. For the practical reason of easy operation, a temperature of from about 75° to 125° C. is recommended, although a temperature of 98° to 100° C. has been used in carrying out the examples.

The proportions of fat solvent to crude wax in the fat solvent-crude wax solution which is contacted with the fat solvent-wax slurry, may be varied from about 0.1 to 0.7 pound of fat solvent per pound of wax. However, a ratio of 0.5 pound of fat solvent per pound of crude wax is preferred. The use of too little fat solvent results in poor disintegration of the solidified wax on cooling, with resulting poor extraction of the soft fraction. Too much fat solvent increases the amount of heat to be added and removed, and also on cooling yields a slurry which has poor filtration characteristics than when the amount of fat solvent shown within the above range is used.

To give the desired concentration of slurry in the slurry vessel, additional fat solvent is introduced into the vessel. The relative proportions of fat solvent to crude wax in the slurry may be varied from a minimum of about 4 pounds of fat solvent per pound of crude wax upward. In practice it has been found that a ratio of about 4 pounds to about 8 pounds of fat solvent per pound of crude wax is preferred. Lesser amounts of fat solvent yields a slurry that is too thick to handle effectively in the filtration operation. Greater amounts of fat solvent have the disadvantage of holding too much of the hard wax fraction in solution and of requiring more heat to evaporate the fat solvent away from the soft fraction after the filtration operation.

The temperature of 25° to 30° C. at which the slurry was maintained in Example 1 was chosen for practical reasons. While temperatures above this range may be used, the amount of hard fraction held in solution will be increased. Lower temperatures may be used with very efficient results except that they will require the use of mechanical refrigeration to cool the reflux condenser, while a temperature of 25° to 30° C. can be obtained with cooling water in most localities.

It is suggested that as the hot wax solvent-crude wax solution is introduced into the cold slurry that adequate agitation at the point of entry of the solution be provided. In this manner a slurry of finely divided particles is produced which may effectively contact solvent and solids to permit good extraction of the soft fraction and at the same time retain a physical structure of the solids which will permit readily separating them from the solution by filtration.

While in Example 1 the acetone from the crude wax solution was vaporized as it was injected into the agitated vessel, other methods of precipitating the hard wax fraction from the hot wax solution may be used. For example, the contacting of the hot wax solution with the cooled wax slurry is sufficient.

While various apparatus may be used to carry out this process, for small scale operations a vessel 10, of which Figure 1 is a schematic drawing, consisting essentially of a vertical mounted U-tube 11, the top end of the legs 12 and 13 of which are connected to a cylindrical chamber 14 which serves to connect the legs 12 and 13 to complete the slurry path and as a disengaging space for liquid and vapor, has been found convenient. One of the legs 12 contains an agitator shaft 15 carrying one or more propellers 16 which circulates the slurry upward past an injection valve 17. The vapor formed in flashing serves as a vapor lift to assist the propellers 16 in causing circulation. The hot fat solvent-crude wax solution and the additional fat solvent to give proper slurry concentrations may be fed continuously, if desired. In this case the slurry is thus formed continuously and may be drained off through an overflow port 18. Minimum holdup of slurry is a desirable feature of this vessel design, as it has been found that prolonged retention of slurry in the system impairs its filtration characteristics. Aging of the slurry without agitation has a lesser detrimental effect and has some beneficial effect on extraction efficiency of the soft fraction, so that aging of the slurry up to about one half an hour may be considered desirable.

The equipment used to filter the slurry produced in the manner described may be conventional filtration equipment. However, a loss of solvent vapor may be prevented by using a continuous rotary filter of the totally enclosed type.

Likewise the evaporating of the filtrate may be carried out in conventional evaporating equipment. The last trace of fat solvent is difficult to remove with ordinary evaporating equipment, but it may be stripped out or removed in a vacuum evaporator.

By my process the separation of the soluble fatty portion from the hard wax fraction is almost instantaneous. Furthermore, by proper control of conditions as disclosed herein the insoluble solids are present in a physical form which renders separation from the solution relatively easy. The method developed also lends itself to continuous separation which, together with a rapid rate of filtration achieved, reduces the solvent inventory in the process and the fire hazard to a minimum. If prefered, however, the process may be carried as a batch operation.

I claim:

1. A process for recovering a hard wax fraction from crude sugar cane wax comprising contacting molten crude sugar cane wax with a fat solvent selected from the group consisting of acetone, methylethylketone, ethyl ether, pentane, hexane and heptane in liquid phase to form a hot wax solution, the ratio of fat solvent per pound of crude wax being from about 0.1 to about 0.7, contacting said wax solution with a solvent-wax slurry in which the solvent is selected from the group consisting of acetone, methylethylketone, ethyl ether, pentane, hexane and heptane and the ratio of solvent to wax being at least 4:1 by weight, at a temperature at which the hard fraction precipitates from said solution, and recovering the hard wax fraction.

2. A process for recovering a hard wax fraction from crude sugar cane wax comprising contacting molten crude sugar cane wax with acetone in liquid phase to form a hot wax solution, the ratio of acetone per pound of crude wax being from 0.1 to about 0.7, contacting said wax solution with an acetone-wax slurry, at a temperature at which the hard fraction precipitates from said solution, the ratio of acetone to waxy being at least 4:1 by weight, and recovering the hard wax fraction.

3. A process for recovering a hard wax fraction from crude sugar cane wax comprising contacting molten crude sugar cane wax with methylethylketone in liquid phase to form a hot wax solution, the ratio of methylethylketone per pound of crude wax being from about 0.1 to about 0.7, contacting said wax solution with a methylethylketone-wax slurry, at a temperature at which the hard fraction precipitates from solution, the ratio of methylethylketone to wax being at least 4:1 by weight, and recovering the hard wax fraction.

4. A process for recovering a hard wax fraction from crude sugar cane wax comprising contacting molten crude sugar cane wax with hexane in liquid phase to form a hot wax solution, the ratio of hexane per pound of crude wax being from about 0.1 to about 0.7, contacting said wax solution with a hexane-wax slurry, at a temperature at which the hard fraction precipitates from said solution, the ratio of hexane to wax being at least 4:1 by weight, and recovering the hard wax fraction.

5. A process for recovering a hard wax fraction from crude sugar cane wax comprising contacting molten crude sugar cane wax with acetone in liquid phase to form a hot wax solution, the ratio of acetone per pound of crude wax being from 0.1 to about 0.7, injecting the hot wax solution into an acetone-wax slurry in such manner that acetone is vaporized, the ratio of acetone to wax being at least 4:1 by weight, recovering a hard wax fraction from said slurry.

6. A process for recovering a hard wax fraction from crude sugar cane wax comprising contacting molten crude sugar cane wax with methylethylketone in liquid phase to form a hot wax solution, the ratio of methylethylketone per pound of crude wax being from 0.1 to about 0.7, injecting the hot wax solution into a methylethylketone-wax slurry in such manner that methylethylketone is vaporized, the ratio of methylethylketone to wax being at least 4:1 by weight, recovering a hard wax fraction from said slurry.

7. A process for recovering a hard wax fraction from crude sugar cane wax comprising contacting molten crude sugar cane wax with hexane in liquid phase to form a hot wax solution, the ratio of hexane per pound of crude wax being from 0.1 to about 0.7, injecting the hot wax solution into a hexane-wax slurry in such manner that hexane is vaporized, the ratio of hexane to wax being at least 4:1 by weight, recovering a hard wax fraction from said slurry.

8. A process for recovering a hard wax fraction from crude sugar cane wax comprising contacting molten crude sugar cane wax with acetone in liquid phase to form a hot wax solution, the ratio of acetone per pound of crude wax being from 0.1 to about 0.7, precipitating a hard wax fraction from said hot wax solution by removing said hot wax-acetone solution from a region of high pressure to a lower pressure area containing an acetone-wax slurry, the ratio of acetone to wax being at least 4:1 by weight, recovering said hard wax fraction.

9. A process for recovering a hard wax fraction from crude sugar cane wax comprising contacting molten crude sugar cane wax with acetone in liquid phase to form a hot wax solution, the ratio of acetone per pound of crude wax being from 0.1 to about 0.7, precipitating a hard wax fraction from said wax solution by contacting with an acetone-wax slurry maintained at a temperature of about 25° C., the ratio of acetone to wax being at least 4:1 by weight, recovering the hard wax fraction.

10. A process for recovering a hard wax fraction from crude sugar cane wax comprising contacting molten crude sugar cane wax with acetone in liquid phase to form a hot wax solution, the ratio of acetone per pound of crude wax being from 0.1 to about 0.7, contacting with an acetone-wax slurry, at a temperature at which the hard fraction precipitates from said solution, the ratio of acetone to waxy being at least 4:1 by weight, filtering said acetone-wax slurry, and recovering said hard wax fraction.

11. A process for recovering a hard wax fraction from crude sugar cane wax comprising contacting molten crude sugar cane wax with methylethylketone in liquid phase at a temperature of at least 75° C. to form a hot wax solution, the ratio of methylethylketone per pound of crude wax being from about 0.1 to about 0.7, contacting with a methylethylketone-wax slurry, at a temperature at which the hard fraction precipitates from solution, the ratio of methylethylketone to wax being at least 4:1 by weight, filtering said methylethylketone-wax slurry, and recovering said hard wax fraction.

12. A process for recovering a hard wax fraction from crude sugar cane wax comprising contacting molten crude sugar cane wax with hexane in liquid phase to form a hot wax solution, the ratio of hexane per pound of crude wax being from about 0.1 to about 0.7, contacting with a hexane-wax slurry, at a temperature at which the hard fraction precipitates from said solution, the ratio of hexane to wax being at least 4:1 by weight, filtering said hexane-wax slurry, and recovering said hard wax fraction.

OSCAR J. SWENSON.

REFERENCES CITED

The following references are of record in the file of this patent:

UNITED STATES PATENTS

| Number | Name | Date |
| --- | --- | --- |
| 2,330,740 | Pokorny et al. | Sept. 28, 1943 |
| 2,354,247 | Dons et al. | July 25, 1944 |
| 2,381,420 | Balch | Aug. 7, 1945 |
| 2,391,893 | Goepfert | Jan. 1, 1946 |